Nov. 11, 1958 — P. H. SPENCER — 2,859,553

TOY AIRPLANE

Filed Oct. 2, 1956

INVENTOR.
PERCIVAL H. SPENCER
BY Elliott & Pastoriza
ATTORNEYS

United States Patent Office 2,859,553
Patented Nov. 11, 1958

2,859,553

TOY AIRPLANE

Percival H. Spencer, Santa Monica, Calif.

Application October 2, 1956, Serial No. 613,434

1 Claim. (Cl. 46—74)

This invention generally relates to aircraft construction and more particularly to toy aircraft of the ornithopter or flapping wing type. The present invention is an improvement over applicant's previous application for toy aircraft filed October 6, 1932 and assigned Serial Number 636,485, which subsequently issued as Patent Number 1,907,887 on May 9, 1933.

In the above referred to application, applicant disclosed a toy aircraft of the ornithopter type embodying wings designed primarily as propelling surfaces in conjunction with means for oscillating the wings to achieve a necessary propelling effect.

Although the design shown and described in applicant's previous application was found to be practical and commercially exploitable, the present invention embodies certain improvements which yield greater stability and maneuverability of such ornithopter type aircraft.

It is, consequently, an object of the present invention to provide an ornithopter type of aircraft susceptible of relatively high propelling power and yet which is considerably more stable in flight than ornithopters presently developed, particularly with respect to take-off and landing operations.

Another object is to provide a toy aircraft which has a minimum number of parts and which is rugged and simple in its construction so as to lend itself to simple manufacturing procedures, and which is structurally designed to be relatively free from maintenance and repair despite frequent usage and rough handling.

These and other objects and advantages of the present invention for an improvement in an aircraft are generally attained by providing in an aircraft an elongated body member with wing surfaces extending laterally out from the body member, one on each opposite side thereof. As a primary feature of the present invention, each of the wing surfaces has an inner, relatively rigid portion for lift of the aircraft and an outer, flexible portion for propelling the aircraft. In addition, conventional mechanical oscillating means are provided to impart a flip-flop motion to the wing surfaces and result in a propelling effect from the outer flexible portions according to the well known ornithopter principle.

In a preferred embodiment, the aircraft would additionally include a generally horizontal tail surface, and means for additionally imparting an oscillatory movement to the tail surface to effect an auxiliary propelling movement to the aircraft.

A better understanding of the present invention will be had by reference to the accompanying drawings, showing merely a preferred embodiment for illustrative purposes, in which.

Figure 1:
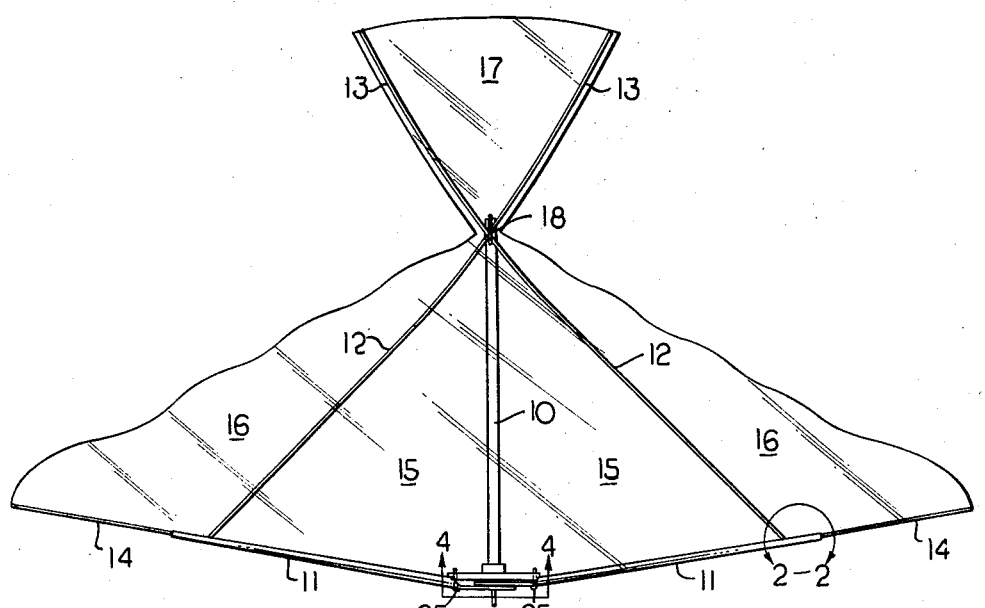
Figure 1 is a top plan view of a toy aircraft according to the present invention.

Referring now to the drawings, there is shown in Figure 1 an aircraft embodying the principles of the present invention and including an elongated body member 10, from which are supported laterally extending wing spars 11. The wing spars 11 are coupled adjacent their outer ends to longitudinal braces 12. The braces 12 include, respectively, integrally formed aft extensions 13 and lateral extensions 14.

The main lifting surface for the aircraft is provided by inner wing surfaces 15, disposed on each opposite side of the body member 10. Wing surfaces 15 are relatively rigid, and are each secured, respectively, to the body member 10, a wing spar 11, and a brace 12. The propelling surface of the aircraft is provided by the outer wing portions 16 which are flexible and are adapted to oscillate about an angular axis formed by each brace 12 and its lateral extension 14.

In order to afford horizontal stabilization to the aircraft as well as to provide an auxiliary propelling means, a tail surface 17 is secured to the aft extensions 13 of the braces 12. The tail surface 17 is also constructed for limited oscillatory movement in conjunction with the oscillation of the outer wing surfaces 16 in a manner that will become clearer as the specification proceeds. Towards this end, the braces 12 are coupled together at a point 18 for limited pivotal movement with respect to the body member 10.

Figure 2:
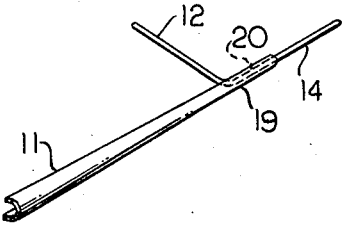
Figure 2 is an enlarged perspective view of the encircled portion 2—2 of Figure 1.

The constructional details and operating principles of the present invention may be more clearly understood and described with reference to Figures 2, 3 and 4. From the view of Figure 2, it will be seen that the wing spars 11 are "C-shaped" in cross section and are gradually tapered towards their outermost ends or tip portions 19. As a preferred method of coupling the braces 12 to the wing spars 11, the tip portions 19 of the spars 11 are crimped down over curved portions 20 of the braces 12, which integrally join together the braces 12 and their lateral extensions 14. The wing spars 11, in this regard, may be formed of a light metal such as aluminum. It will be appreciated, nevertheless, that the wing spars may be formed of other materials and that different coupling means might be employed to secure the braces 12 at their curved sections 20 to the tips 19 at the outer ends of the spars.

Figure 3:
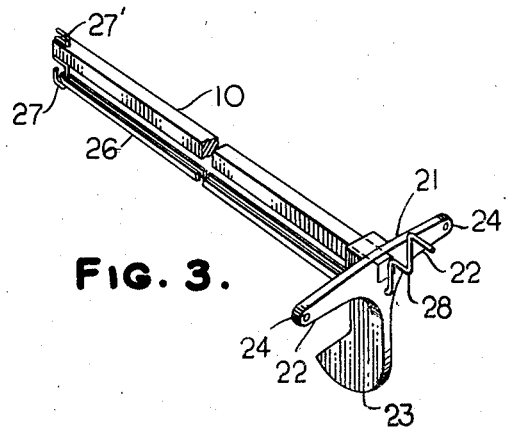
Figure 3 is an enlarged perspective view of the body member of the toy aircraft shown in Figure 1; and, Figure 4 is an end view of the aircraft shown in view of Figure 1 taken in the direction of the arrows 4—4, the oscillating means being shown in a different position for purposes of description.

A preferred construction for the under portion or fuselage of the aircraft is shown in Figure 3, where it is shown that the elongated body member 10 has its forward end secured within a supporting member 21 having cross arms 22. The supporting member 21 additionally includes a downwardly extending fin 23. The arms 22 are provided to enable connection of the wing spars 11 to the supporting member. For this purpose, the arms 22 are provided with apertures 24 adapted to receive pins 25 (shown in the views of Figures 1 and 4), which connect the inner ends of the spars 11 with the arms 22 in journaled relationship.

The wing spars 11 are oscillated in a manner similar to the action disclosed in applicant's previously referred to patent application. As shown in Figure 3, a rubber band or the like 26 is disposed below the body member 10 and looped at one end around a hook member 27, in turn, secured to the aft end of the body member 10. The other end of the rubber band 26 is hooked about an end (not shown) of the crank 28 extending through the supporting member 21. Thus, the rubber band 26 is wound up to store energy for propelling aircraft by merely winding the crank 28.

Figure 4:
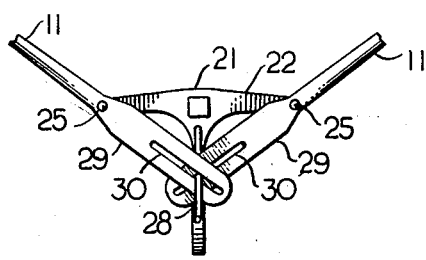

The crank 28, in turn (as shown in Figure 4), is coupled to links 29 integrally formed with the spars 11.

For this purpose, slots 30 may be provided in the links within which the crank 28 may turn to provide oscillating movement to the spars 11. In the view of Figure 4, the links 29 are shown in position as the spars 11 are approaching the upper limits of their angular movement.

It will be appreciated that an aircraft of the design according to the present invention is primarily adapted for use as a toy, although certain of the principles are adaptable to full scale applications. In operation, the fin 23 is merely employed as a means of manually holding the plane preparatory to flight while the crank 28 is wound to store propelling energy in the rubber band 26. As soon as the crank 28 has been wound a sufficient number of times, the airplane may be released for flight. As the rubber band 26 unwinds, the crank 28 will rotate in a counter clockwise direction causing the links 29 to move up and down with the result that a propelling force will be created by the flexible wing surfaces 16. Although the inner wing surfaces 15 will also be oscillating, in view of their relative rigidity, they will tend merely to add a greater lifting surface and stability to the aircraft without yielding any appreciable propelling effect. On the other hand, the tail surface 17, as a result of the integral formation of the tail extensions 13 with the braces 12, will also oscillate through a given angle. In order to permit such pivoting of the tail surface 17, the crossing point of the braces 12 at 18 is loosely secured under an upper hook portion 27' of the hook member 27, as more clearly shown in the view of Figure 3. With such a construction, as each brace 12 moves upwardly, its aft extension 13 will move downwardly and vice versa. It has been found that this back and forth movement of the tail surface 17 gives an auxiliary propelling effect to the aircraft as well as adding stability in horizontal flight.

By providing flexible wing surfaces 16 on the outer portion of the wings and relatively rigid wing surfaces 15 on the inner portions in the improved aircraft of the present invention, tests have shown that such construction enables the aircraft to maintain a longer and more controllable glide path. The wing surfaces 15, although necessarily oscillating with the spars 11, primarily provide a large area of lifting surface, since they do not move relative to the wing spars 11 to create a propelling motion as do the outer surfaces 16.

In a preferred construction, it has been found that the surfaces 15, 16 and 17 are advantageously formed from a plastic film, such as a product marketed by Dupont under the trademark "Milar," which is strong, light and flexible, although other equivalent materials might appropriately be used.

Although the improvement for an aircraft according to the present invention has been shown and described in a preferred construction, it will be appreciated that minor changes and modifications may be made without departing from the spirit and scope of the invention as defined by the following claim.

What is claimed is:

In an aircraft: an elongated body member; wing spars extending out from said body member, one on each of the opposite sides thereof, said spars being pivotally coupled at the forward end of said body member; a sheet of flexible surface material centrally secured to said body member and having an inner portion of its forward edge fastened along said spars; a pair of braces pivotally connected to the aft end of said body member and extending forwardly and outwardly to, respectively, connect with the outer ends of said wing spars, said braces including integral forward extension portions angled to form spar extensions from said outer ends, respectively, of said wing spars; said braces further including integral aft extension portions extending beyond the aft end of said body member; a flexible surfacing material secured to said aft extension portions to form a generally horizontal tail surface; and, driving means supported from said body member and coupled to said wing spars for oscillating said spars, whereby said tail surface will move in response to movement of said wing spars.

References Cited in the file of this patent

UNITED STATES PATENTS

| 234,947 | Brearey | Nov. 30, 1880 |
| 980,840 | Rozboril et al. | Jan. 3, 1911 |
| 1,758,178 | Slinn | May 13, 1930 |
| 2,182,406 | Ogsbury et al. | Dec. 5, 1939 |
| 2,321,977 | Boatwright | June 15, 1943 |

FOREIGN PATENTS

| 420,700 | France | Dec. 1, 1910 |